United States Patent
Werner

[15] 3,672,512
[45] June 27, 1972

[54] STATIC THICKENER AND HYDRAULIC RAKE THEREFOR

[72] Inventor: Roy H. Werner, Pittsburgh, Pa.
[73] Assignee: Barrett Haentjens & Co., Coraopolis, Pa.
[22] Filed: Aug. 6, 1970
[21] Appl. No.: 61,688

[52] U.S. Cl. .............................................210/523
[51] Int. Cl. .............................................B01d 21/24
[58] Field of Search ...............210/83, 513, 523, 525, 528, 210/242

[56] References Cited

UNITED STATES PATENTS

| | | | |
|---|---|---|---|
| 2,468,069 | 4/1949 | Hunter | 210/83 X |
| 3,333,704 | 8/1967 | McGivern et al. | 210/242 |

FOREIGN PATENTS OR APPLICATIONS

| | | | |
|---|---|---|---|
| 276,416 | 5/1913 | Germany | 210/523 |

Primary Examiner—J. L. DeCesare
Attorney—Hill, Sherman, Meroni, Gross & Simpson

[57] ABSTRACT

Hydraulic rake for water treatment settling basins of static thickeners. The rake includes a series of statically mounted pipes arranged along the basin, below the sludge level in the basin, in a pattern to provide uniform coverage of the entire floor area of the basin. Fluid pressure or electrically operated valves are connected with certain of the pipes to selectively connect the pipes to the intake of an underflow pump. One pipe may be connected to the pump through its open valve to remove the settled matter above it through spaced nozzles in the pipe. A next pipe may then be connected to the underflow pump to remove the settled matter above it. This is repeated in a preselected order to completely rake or sweep the floor of the basin and remove solids as settling down toward the basin floor.

4 Claims, 4 Drawing Figures

PATENTED JUN 27 1972 3,672,512

INVENTOR.
Roy H. Werner
BY Hill, Sherman, Meroni, Gross & Simpson
ATTORNEYS

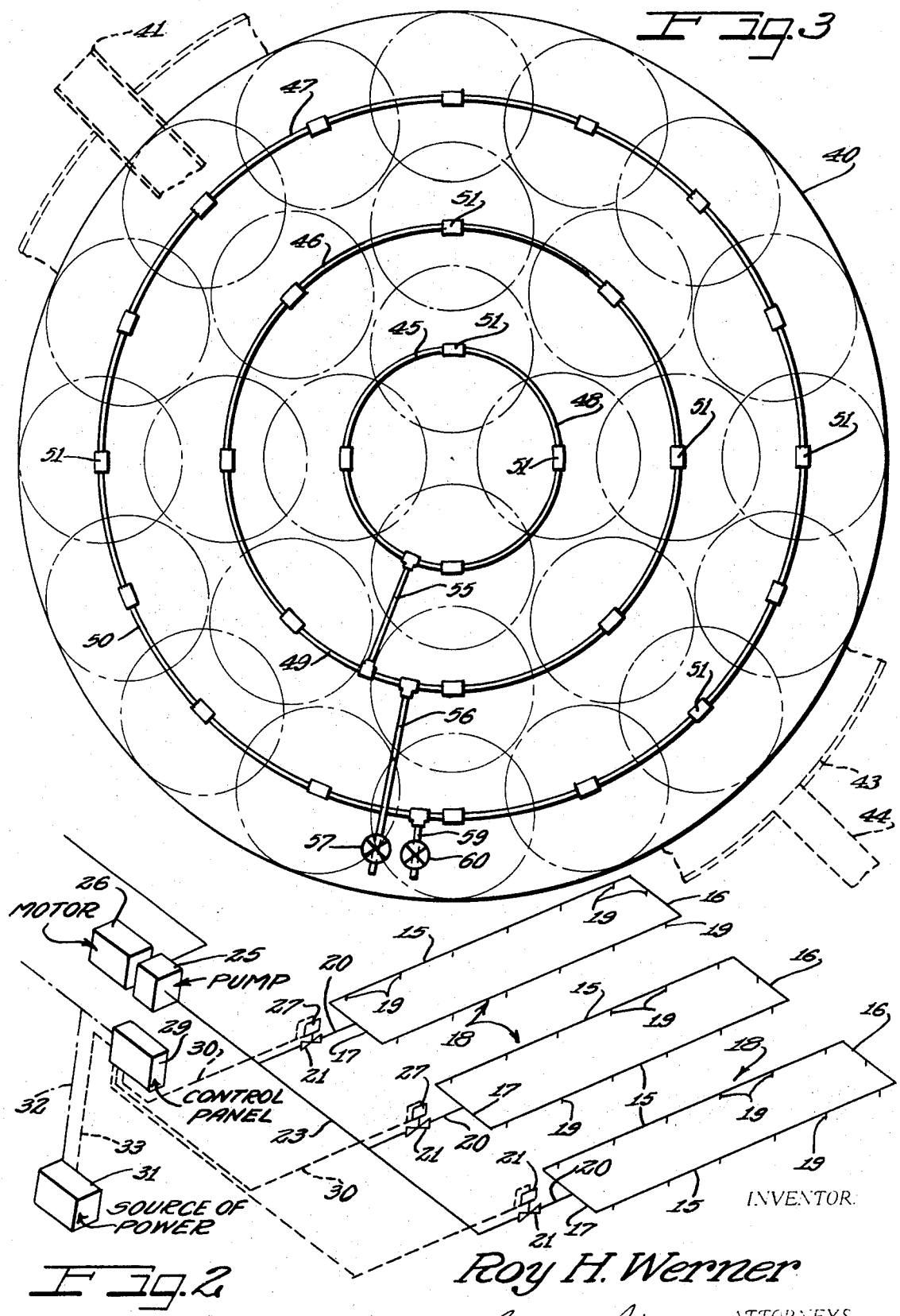

STATIC THICKENER AND HYDRAULIC RAKE THEREFOR

BACKGROUND OF THE INVENTION

In conventional water treatment processes and particularly those involving acid wastes, typically mine water, the process consists of acid neutralization of a milk of lime solution, aeration to convert dissolved ferrous oxide to ferric oxide, and then allowing the ferric oxide precipitates to settle to provide a clear neutralized effluent.

Due to the large volume of the precipitate, a thicker is provided for settling the precipitate and concentrating it for pumping to an impounding area. Such thickeners are expensive because they require rakes which are driven to sweep the floor of the thickener, which is tapered downwardly toward the center, to being the settled solid matter to the center of the thickener, to a central opening, where it is removed by a solids handling pump.

The settling basin of the thickener is, for example, at least 100 feet in diameter and the drive mechanism and supporting structure for the rake supports a revolving arm which may extend diametrically across the basin, and, therefore, is bulky and expensive and the subject of continuous maintenance.

SUMMARY AND OBJECTS OF THE INVENTION

The present invention replaces the mechanically driven rakes for settling basins of thickeners with a system of statically mounted pipes on the floor of the settling basin having spaced suction openings therein, and arranged in a pattern to provide uniform coverage of the entire floor area of the basin.

A principal object of the present invention is to improve upon the thickeners heretofore in use, by providing a simpler and more economical and effective means for removing settled solids from the floor of a thickener basin.

A further object of the invention is to provide an improved form of rake for water treating thickeners, replacing the mechanically driven rakes heretofore in use, by the provision of statically mounted pipes spaced along the floor of the thickener, having nozzle openings arranged in a pattern to provide uniform coverage of the entire floor area of the thickener, and by selectively connecting the pipes to a source of suction.

A still further object is the invention is to provide an improved apparatus and system for removing settled solids from a thickener or settling basin without the use of the mechanically driven rotating rakes heretofore used for this purpose.

Still another object of the invention is to remove a uniform consistency of sludge from a settling basin, by substituting a series of statically arranged pipes for the mechanical gathering devices for the basin, and by providing a simplified form of control for connecting the pipes to a source of suction in a preselected sequence to sweep the bottom of the basin.

A still further object of the invention is to utilize a series of statically mounted pipes having suction openings therein to sweep the floor of the settling basin of a thickener, together with a control means for connecting the pipes and suction nozzles to a source of suction in a sequence determined by particle drop out.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 2 is a schematic view illustrating the sludge removal system of FIG. 1 and showing a piping arrangement arranged to sweep the floor of the basin, and the controls for selective of the pipes for selectively connecting the pipes to a source of suction.

FIG. 3 is a plan view of a circular settling basin illustrating a piping arrangement for sweeping the entire floor of the basin.

DESCRIPTION OF PREFERRED EMBODIMENTS OF INVENTION

Figure 1:
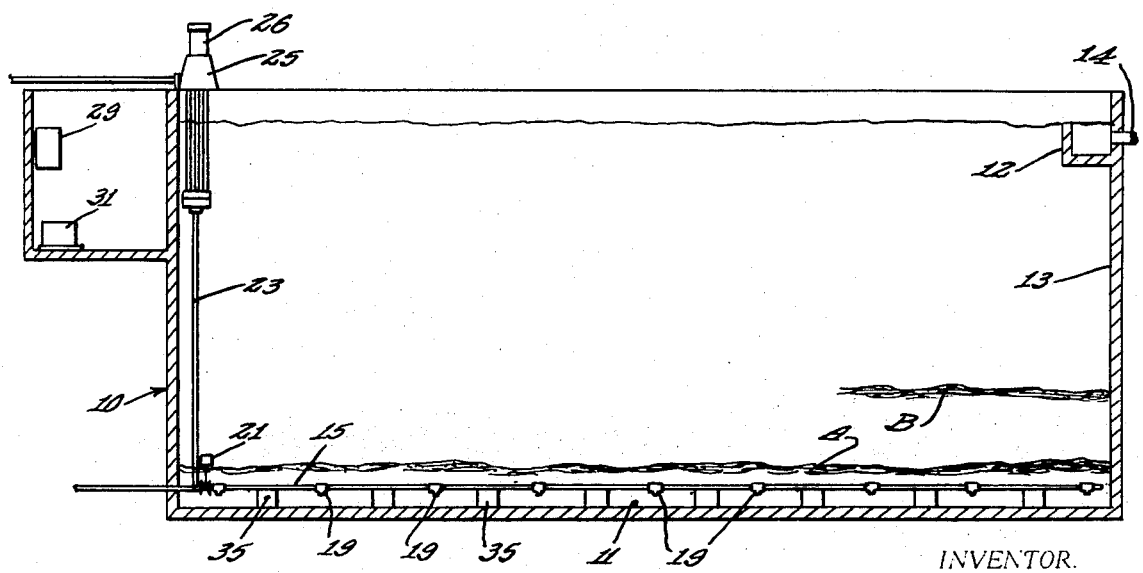
FIG. 1 is a diagrammatic vertical sectional view taken through a rectangular settling basin and hydraulic rake constructed in accordance with the principles of the present invention.

In FIG. 1 of the drawings, I have diagrammatically shown a settling basin 10 of a thickener, which may be rectangular or cylindrical in plan and has a flat floor 11 and vertical side and end walls extending upwardly therefrom. An effluent trough 12 is shown as extending about the upper end portion of an end wall 13 for collecting clear effluent and conducting it to an overflow 14. The effluent trough may extend entirely about the basin.

The basin 10 have have a series of parallel lateral pipes 15, 15 extending thereacross, each pair of pipes being connected together by a pipe 16 at their outer ends adjacent one end of the basin, and by a pipe 17 at their opposite ends at the opposite end of the basin to form a rectangular fluid flow grid or loop 18, having a plurality of spaced suction nozzles 19, 19 leading downwardly therefrom, and opening to the floor 11. A pipe 20 having a valve 21 therein, leads from each pipe 17 and is connected with a main suction line 23, connected with a differential power producer, which may be in the form of a pump 25 and motor 26, or ejector (not shown), or any other device for drawing the settling solids and liquid through the nozzles 19.

The fluid flow loops or grids formed by the pipes 15, 15, 16 and 17 are spaced along the settling basin 10 above the floor on spacers 35 which may be in the form of concrete blocks or any other suitable support means, spacing said loops beneath the sludge level to draw in solids as they settle to the floor, as shown in FIG. 1. FIG. 1 diagrammatically shows a lower sludge level A and an upper sludge level B. This sludge level may vary in accordance with the type of sludge and solids or precipitate, or in accordance with operating conditions and is shown for illustrative purposes only.

The loops 18 are spaced along the basin 10 at spacings sufficient to afford full coverage of the floor of the basin for the length thereof, and are thereby arranged to provide a pattern covering the entire area of the floor of the basin.

The valves 21 may be fluid pressure operated or electric motor operated valves, and include power operators 27 connected with a control panel 29 through conductors 30, which may be fluid pressure conductors or electrical conductors, depending upon how the valves are operated. Where the valves 21 are fluid pressure operated, a source of fluid under pressure 31 may be provided, which may be a pump and a motor connected to a fluid pressure tank (not shown) through a supply line 32, and having connection with the control panel 29 through a pressure line 33. The control panel 29 may be of any suitable construction arranged to be manually or automatically operated and may include a program controller which may be set to selectively operate the valves to supply fluid under pressure first to one loop 18 and the nozzles 19 opening downwardly therefrom to cover a preselected area of the tank, and to then effect closing of the valve connecting this loop to a source of suction and opening of the valve 21 connecting a next adjacent loop, to a source of suction, and so on, to sweep the entire floor of the basin and draw in settling solids through the nozzles 19 in a preselected order. The order of sweep may be from one end of the floor to the other or from opposite ends toward the center or in any other selected pattern. While I herein refer to the connection of one grid at a time to a source of suction it should be understood that any number of selected grids may be simultaneously connected to a source of suction, depending upon the type of sludge being removed.

Where the valves 21 are electrically operated, 31 may be a source of electrical energy and the control panel may be an electric control panel operable to selectively energize motors such as rotary or solenoid types of motors, for opening and closing the valves in a preselected sequence, to sweep the floor of the basin.

In FIG. 1 of the drawings, the pump 25 and motor 26 are shown as being a vertical pump and motor, which may be a conventional form of vertical underflow pump having the intake line 23 connecting the pump with the loops 18 through the valves 21 as shown in FIG. 2. The control panel 29 and source of fluid under pressure 31 are shown as being contained in a control chamber 39 to one side of the end wall 10 of the basin. If desired, the control valves and pump may be located in the control chamber 39 and have connection with the intake line 23 and the intake to the pump 25.

In operation of the system, one grid or loop and the nozzles 19 are connected to the pump 25 by opening the valve 21 to remove the settled material above it through the nozzles 19 in the associated loop 18.

When a single grid has removed the settled material in its immediate area and there is no longer flow along the bottom of the basin into the suction nozzles 19, as evidenced by a decrease in the specific gravity of the underflow precipitate or slurry, then this grid is shut off by means of a valve 21 and another grid is connected to the pump intake, to remove the settled material in its immediate area in the manner just described. It has been found that where the valves 21 are operated in timed relation so as to select the order of sweep, an effective hydraulic sweep of the entire floor of the thickener may occur.

The type of settled material for which this sweep is particularly adapted is a material that has a low angle of repose and flows rather freely for a limited distance. Such materials are extremely fine and the resulting underflow may be described as of a viscous mixture, exhibiting either dilatant, thixotropic or pseudoplastic properties, rather than pure newtonian properties. The system, however, is suitable for pure newtonian mixtures or the static separation of light and heavy liquids having a low angle of repose, which will flow into the spaced nozzles on the suction pipes.

Figure 4:
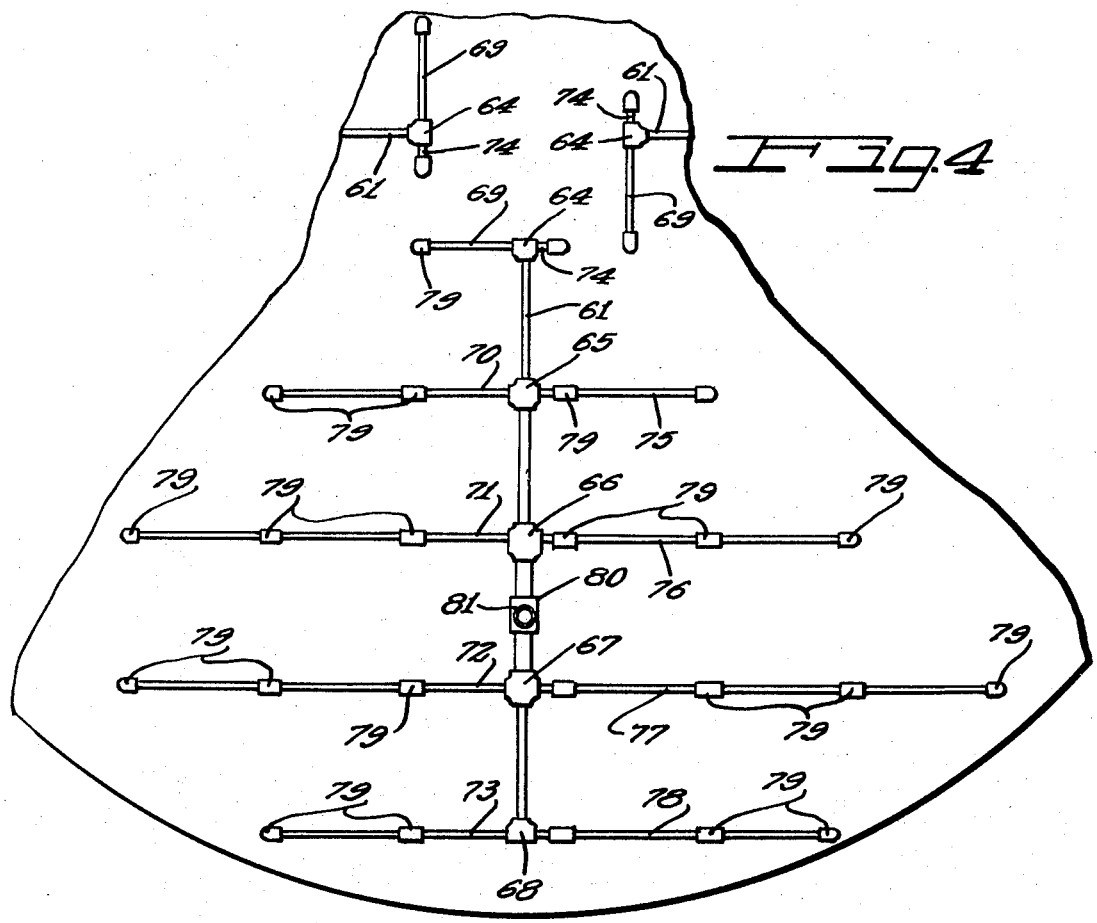
FIG. 4 is a diagrammatic view of a segment of a round settling basin, illustrating a modified form of piping arrangement for sweeping the floor of the basin.

In FIGS. 3 and 4 of the drawings, I have illustrated hydraulic sweep arrangements for cylindrical basins. In the form of the invention shown in FIG. 3, a cylindrical settling basin 40 is diagrammatically shown as having an inlet 41 for influent for admitting the previously treated water to the thickener or settling basin 40. The inlet 41 usually discharges the waste water to a well (not shown) close to the center of the basin. The basin also has an effluent weir 43 similar to the weir 15, extending thereabout and connected with an effluent discharge pipe 44, leading from the weir. As shown in FIG. 3, a plurality of pipes 45, 46 and 47 are arranged in circular forms to form concentric sweeping fluid flow loops 48, 49 and 50 increasing the diameter towards the outer wall of the basin. The pipes 45, 46 and 47 have nozzles 51 connected therein opening toward the floor of the basin. The circular pipe 45 is connected with the pipe 46 through a radial pipe 55. A radial pipe 56 leads from the pipe 46 and has a valve 57 connected therein, connected to the intake of an underflow pump (not shown) which may be like the pump 25. The outer cylinder loop 50 has a suction pipe 59 leading therefrom connected with a valve 60, which may be like the valve 57, and connects the pipe 59 with a source of suction, upon closing of the valve 57. The broken line circles about the nozzles 51 illustrate the suction pattern of each nozzle and illustrate how the entire bottom area of the basin is covered by the nozzles 51, to provide an effective sweep for the entire floor area of the basin.

In FIG. 4 of the drawings, I have shown still another form of piping and suction nozzle arrangement for sweeping the floor area of a cylindrical settling basin. In this piping arrangement, a series of radial pipes 61 are spaced about a settling basin 63 close to the floor thereof, preferably 90° apart. Each radial pipe 61 is formed from a series of aligned pipes connected together by fittings 64, 65, 66, 67 and 68. Pipes 69, 70, 71, 72 and 73 extend from the respective fittings 64 to 68 inclusive at right angles with respect to said radial pipes and have communication with said radial pipes through said fittings. Aligned pipes 74, 75, 76, 77 and 78 extend from the respective fittings 64 to 68 inclusive in an opposite direction from the respective pipes 69 to 73 inclusive. The pipes 69 to 73 inclusive and 75 to 78 inclusive, each have a series of downwardly opening nozzles 79 therein connected to the intake of an underflow pump through the radial pipe 61. The pipes 69 and 74 are shown as having a single nozzle 79 therein, although the number of nozzles may be varied to provide an effective sweep of the floor of the basin. Each piping arrangement is, therefore, arranged to provide an effective sweep for a quadrant of the circular basin.

A fitting 80 is provided in the radial pipe 61 between the fittings 66 and 67, and has a vertically extending pipe 81 extending upwardly therefrom having a valve (not shown) therein enabling the pipe 61 to be connected to a source of suction. The valve may be like the valves 21, 57 or 60, and may be opened and closed under the control of a suitable control circuit in a preselected sequence.

In this form of the invention like the form of the invention illustrated in FIG. 3, a first radial pipe 61 may be connected with a source of suction until the settled material has been removed by the nozzles 79 connected with the pipe 61 as evidenced by a decrease in the specific gravity of the discharge from the underflow slurry pump and the ceasing of the flow of slurry along the bottom of the tank into the suction nozzles or openings 79. The valve connecting the selected pipe 61 and nozzles 79 to the source of suction may then be closed. A next radial pipe 61 may then be connected with the source of suction as the first radial pipe is disconnected from the source of suction, until there is no longer a flow along the bottom of the tank into the suction nozzles 79. The next succeeding pipes may then be selectively connected to a source of suction until the entire bottom of the cylindrical tank has been swept.

It should be understood that while we show suction nozzles, that drilled holes in the pipes, pipe tees with the orifices, sanitary type tees with reduced openings may serve as suction nozzles and that the form of the nozzle will vary in accordance with the different types of sludges the system is to handle.

The operation of the valves connecting the underflow pump to a particular suction line may also vary in an effort to program opening of the valves and connection of the pipes to the source of suction to coincide with solids or particle drop out.

It may be seen from the foregoing that a simplified static hydraulic rake has been provided, for either rectangular or cylindrical settling basins, in which the rake is in the form of a series of static pipes extending along the bottom of the settling basin and having nozzles therein facing the bottom of the basin and patterned to sweep the floor of the basin, and connected with a source of suction in preselected order, to completely sweep the floor of the basin, thus eliminating the conventional traveling rakes and drive mechanism and making it unnecessary to slope the bottom of the tank to a central sump or drain.

I claim as my invention:
1. In a static thickener,
a settling basin having a flat floor for the settling of solid particles,
a hydraulic rake extending along said floor and including,
a static piping arrangement, means supporting said piping arrangement above but close to said floor,
a plurality of suction nozzles connected with said piping arrangement and opening toward said floor and spaced along said piping arrangement to cover the entire area of said floor,
said piping arrangement including separate sections of piping spaced along said floor to cover the entire area thereof,
a source of suction, an individual power operated valve for each section of piping, means controlling operation of said valves including a source of power, a control panel connected with said source of power and effective to selectively open and close individual of said valves in said separate sections of piping in a preselected sequence to effect a progressive sweeping action over the entire area of said floor in accordance with particle drop out and to thereby collect the solid particles as settling to the floor.

2. The static thickener of claim 1, wherein the settling basin is rectangular, wherein the separate sections of piping are in the form of closed rectangular loops spaced along said floor to position the suction nozzles in said loops opening to said floor to cover the area of said floor, wherein a power operated valve is connected with each loop, and wherein the control panel is effective to supply power to operate the valves to connect the nozzles in an individual loop to a source of suction and to connect the loops to a source of suction in sequence to sweep the floor of said basin from one end thereof to the other.

3. The static thickener of claim 1, wherein the settling basin is cylindrical, wherein the separate sections of piping include radial pipes extending along and spaced above the floor of said basin, wherein suction pipes extend at right angles to said radial pipes and have the suction nozzles therein opening toward the floor of the basin, wherein the power operated valves are in each radial pipe, and wherein the control means is effective to selectively operate said valves in a sequence determined by particle drop out.

4. The static thickener of claim 1, wherein the settling basin is cylindrical, wherein the separate sections of piping spaced above the floor of the basin are in the form of concentric circular loops spaced along the floor of the basin from the center toward the outside thereof, wherein the nozzles in the loops are equally spaced therealong and open to the floor of the basin, wherein a valve is connected with each circular loop, and wherein the control means is effective to operate said valves by power to selectively connect said pipes in the form of circular loops to a source of suction in sequence to effect a sweeping action of the floor in accordance with particle drop out.

* * * * *